United States Patent [19]
Warsta et al.

[11] Patent Number: 5,896,369
[45] Date of Patent: *Apr. 20, 1999

[54] MOBILE COMMUNICATION SYSTEM AND A METHOD FOR CONNECTING A REMOTE WORKSTATION TO A DATA COMMUNICATION NETWORK VIA A MOBILE COMMUNICATION NETWORK

[75] Inventors: Markus Warsta, Kerava; Timo Jokiaho, Vantaa, both of Finland

[73] Assignee: Nokia Telecommunications Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/617,891
[22] PCT Filed: Sep. 19, 1994
[86] PCT No.: PCT/FI94/00413
§ 371 Date: Jun. 6, 1996
§ 102(e) Date: Jun. 6, 1996
[87] PCT Pub. No.: WO95/08900
PCT Pub. Date: Mar. 30, 1995

[30] Foreign Application Priority Data

Sep. 20, 1993 [FI] Finland ................................... 934115

[51] Int. Cl.$^6$ ............................ H04L 12/28; H04Q 7/22
[52] U.S. Cl. ............................ 370/338; 455/557; 455/560
[58] Field of Search .................................. 370/327, 328, 370/338; 455/556, 557, 560

[56] References Cited

U.S. PATENT DOCUMENTS 4,837,800  6/1989  Freeburg et al. ..................... 455/557
4,887,265  12/1989 Felix .
4,994,963  2/1991  Rorden et al. ........................ 364/200
5,166,931  11/1992 Riddle .
5,274,635  12/1993 Rahman et al. .
5,533,019  7/1996  Jayapalan ............................. 370/352
5,590,133  12/1996 Billstrom et al. ..................... 370/338
5,802,465  9/1998  Hamalainen et al. ................. 455/403

FOREIGN PATENT DOCUMENTS 0 332 825  9/1989  European Pat. Off. .
0 399 611  11/1990 European Pat. Off. .
0 483 547  5/1992  European Pat. Off. .

*Primary Examiner*—Melvin Marcelo
*Attorney, Agent, or Firm*—Pillsbury Madison & Sutro LLP

[57] ABSTRACT

A mobile communication system and a method for connecting a remote workstation to a data network via a mobile communication network, which allow a remote workstation to be connected more flexibly over a radio path by providing a special interconnecting computer in conjunction with a mobile exchange for extending the connection to a designation data network. The interconnecting computer thus acts as a bus between the remote workstation using the mobile communication network and its home data network, simulates the operation of the remote workstation towards the data network, and takes care of the real remote workstation, which is behind the radio path. A data connection established over the radio path can be released so as to minimize the air time when the radio path is not needed for telecommunication, but the interconnecting computer keeps the extended connection active towards the data network.

16 Claims, 2 Drawing Sheets

MOBILE COMMUNICATION SYSTEM AND A METHOD FOR CONNECTING A REMOTE WORKSTATION TO A DATA COMMUNICATION NETWORK VIA A MOBILE COMMUNICATION NETWORK

BACKGROUND OF THE INVENTION

The invention relates to a mobile communication system comprising a mobile data unit acting via a mobile communication network as a remote workstation in a data network; a mobile exchange and; means for establishing a data connection between the mobile data unit and the mobile exchange.

Mobile communication systems have been developed as there have been a need to free people to leave their desktop telephone terminals and a need for others to reach them even when they are outside a specified location. As automation begins to be an integral part of the working environment, people outside offices wish to operate computers everywhere and make connections from any one location to another. The development of mobile communication systems offering voice services in the direction of data services thus seems to be inevitable.

Computer technology makes it possible to produce lightweight truly portable devices with improved processing power, storage capacity and user friendliness. This evolution of computers has made it technically and economically feasible to offer mobile data services for moving people. In such a case, the user is most likely to possess a mobile telephone terminal for voice communication, so the best way to provide data communication is through the mobile telephone system in much the same way as conventional telephone lines are used for data communication by using modems.

The deployment of digital mobile communication systems, such as the Pan-European mobile radio system GSM, means a break-through when mobile data communication is to be supported in general-purpose cellular networks. As the GSM is fully digital and applies the general principles of ISDN (Integrated Services Data Network), it is inherently capable of carrying data. From the data networking point of view, the GSM does not represent a dedicated data communication network but an access network. In other words, data communication via the GSM is intended to provide access to actual data networks.

The GSM network offers a wide range of services to subscribers. In addition to speech and emergency call services, the GSM network supports all variations of low-speed data communication services offered within telecommunication today. The only restriction is set by the capacity of the radio interface, which restricts the data rate to 9.6 kbit/s.

It is thus also possible to use the GSM system to connect a remote workstation to a desired data communication network, such as a Local Area Network (LAN). The remote workstation is usually a conventional workstation (PC) connected to the data interface of a mobile unit (mobile phone). The remote terminal may thus transmit data via the radio path with a data modem provided in association with the mobile exchange and further by means of a modem connection, e.g. through a public telephone network with a second data modem and a data terminal equipment connected to it. This second modem is usually attached to a computer connected to a LAN. This computer is used for enabling remote access to the LAN. It is usually called an Access Server. The access server has several data communication ports to which modems and a software enabling some kind of remote access are connected. Correspondingly, the remote workstation necessarily includes of has access to software in order that it is able to communicate with the access server software.

However, the above-described way of connecting a remote workstation via a mobile communication system to a data network has a few disadvantages. First, for instance, the GSM radio path enables a 9.6-kbit/s transmission rate and an excellent bit error rate of the order of $10^{-8}$. However, the connection is extended between the mobile communication network and the destination data network by means of a modem connection switched via a public telephone network. The maximum transmission rate of this kind of modem connection is usually 2.4 kbit/s, and its bit error rate is on the order of about $10^{-4}$ to $10^{-5}$. The entire connection will thus have the same transmission rate and bit error rate values, which are clearly inferior to those the GSM network, for instance, is able to offer. Second, the prior art method is not sufficiently efficient from the point of view of the radio path, as it is necessary to use a circuit-switched connection in the mobile communication network and keep the radio resources allocated throughout the LAN session, even during silent periods when there is no kind of communication.

SUMMARY OF THE INVENTION

The object of the invention is to connect a remote workstation via a mobile communication system to a data network in such a way that the problems mentioned above are alleviated or avoided.

This is achieved by a mobile communication system of the type discussed in the forgoing BACKGROUND section, which according to the invention is characterized in that the arrangement further comprises an interconnecting computer attached to the mobile exchange, the interconnecting computer extending the connection and simulating the remote workstation towards the data network.

Another aspect of the invention is a method for connecting a remote workstation via a mobile communication network to a data network, the method comprising starting a session from the remote workstation; establishing a data connection over the radio path in the mobile communication network for the data session; and extending the connection between the mobile communication network and the data network. According to the invention the method is characterized by temporarily releasing the data connection in the mobile communication network during the data session, and, when the data connection has been released:

a) the extended connection is maintained towards the data network;

b) the operation of the remote workstation is simulated towards the data network at the end of the extended connection on the side of the mobile communication network; and c) communication addressed from the data network to the remote workstation is monitored, and, if required, a notification is transmitted to the remote workstation over the radio path by non-switched message transmission.

The basic idea of the invention is to facilitate more flexible (more efficient from the view point of costs and radio resources) connectivity via the radio path by using a special interconnecting computer in association with the mobile exchange for extending connections to the destination data network. This interconnecting computer thus acts as a gateway between a remote workstation using the mobile communication network and its home data network; simulates the operation of the remote workstation towards the data network; and takes care of the actual remote workstation which resides behind the radio path. A data connection established over the radio path can be disconnected so as to minimize the air time when the radio path is not needed for data communication, but the interconnecting computer keeps the extended connection active towards the data network. The interconnecting computer transmits the remote workstation a notification by utilizing non-switched message transmission when data communication with the data network is required, and so the remote workstation may start re-establishment of the data connection on the radio path. The remote workstation may also itself start the re-establishment of the data connection if it wishes to. The applications of the remote workstation see the data communication link as active, and so does the data network at the other end of the extended connection. The invention thus allows a virtual connection to be maintained throughout the session; on the other hand, radio resources are allocated only when data communication is actually needed. In addition, the interconnecting computer is connected directly to a suitable LAN network or wide area network, so that modem connections established through a conventional telephone network are avoided while utilizing the full data transmission rate of the radio path and the high bit error rate.

BRIEF DESCRIPTION OF THE INVENTION

In the following the invention will be described with reference to the attached drawings, in which:

FIG. 1 illustrates a mobile communication network according to the invention and its connection to data networks, and FIG. 2 is a more detailed block diagram of the connection of an exchange MSC shown in FIG. 1 to an interconnecting computer 19.

DETAILED DESCRIPTION

The present invention is suitable for use in all digital mobile communication systems for connecting a remote workstation to a data network. It can be applied particularly advantageously in the Pan-European digital mobile communication system GSM and other similar digital systems, such as the DCS1800 and the PCN (Personal Communication Network). Although the preferred embodiment of the invention will be described below referring to an application in the GSM system, the invention its not limited to it.

The ETSI GSM specifications and *The GSM System Mobile Communications*, by M. Moyly & M. B. Pautet, Palaiseau, France, ISBN: 2-9507190-0-7, are referred to for the more detailed structure and operation of the GSM system.

Figure 1:
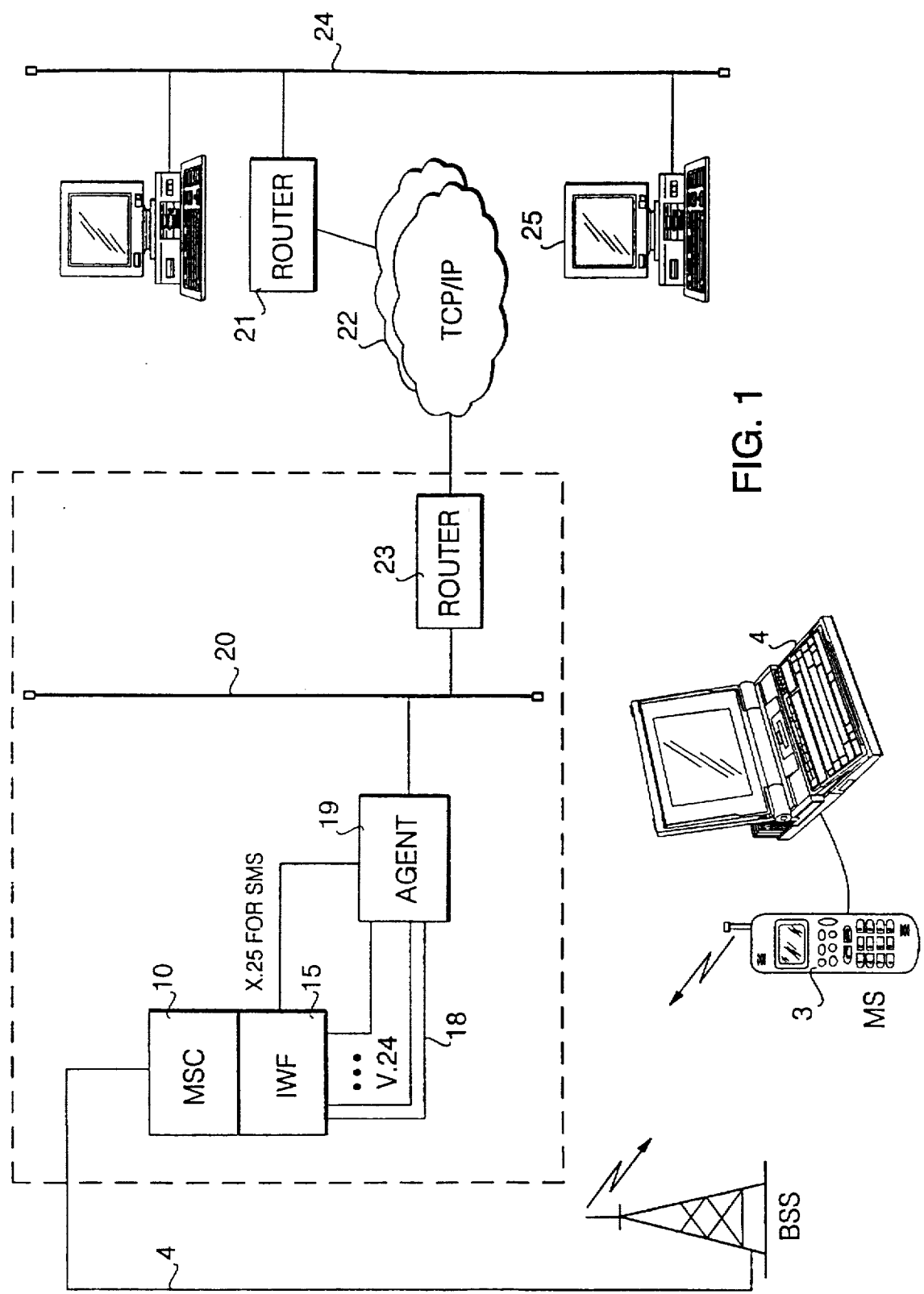

FIG. 1 schematically shows a part of a GSM cellular radio system. In the cellular radio system, the area covered by the system is divided into radio cells. Base station systems BSS (a single system is shown in the figure) are connected to a mobile exchange MSC 10 by digital transmission links 4 (a single link is shown in the figure). Each base stations system BSS comprises a base station controller BSC (not shown), to which one or more base stations BTS (not shown) are similarly connected by digital transmission links. The radio coverage area of one base station BTS typically forms one radio cell. Each base station BTS1 to BTS4 has a predetermined number of physical radio channels. A GSM signal (physical channel) consists of TDMA frames each containing (preferably eight) time slots, in which logical channels are transferred. Logical channels contain traffic channels for calls (voice and data) established with mobile radio stations MS residing in the cell, and control channels for signalling with mobile radio stations MS (mobile units) residing in the cell. A speech connection, V.110-rated 64-kbit/s full-duplex data connection or 9.6/4.8/2.4 kbit/s data connection can be established on the traffic channels. A special adapter is typically needed at both ends of the data connection for adapting the data connection to the terminal equipment and/or other communication lines/communication systems. The adapter associated with the mobile unit is usually called a terminal adapter and the adapter at the network end a network termination IWF. In the GSM mobile radio network, this kind of network termination is located in conjunction with the mobile exchange MSC.

Figure 2:
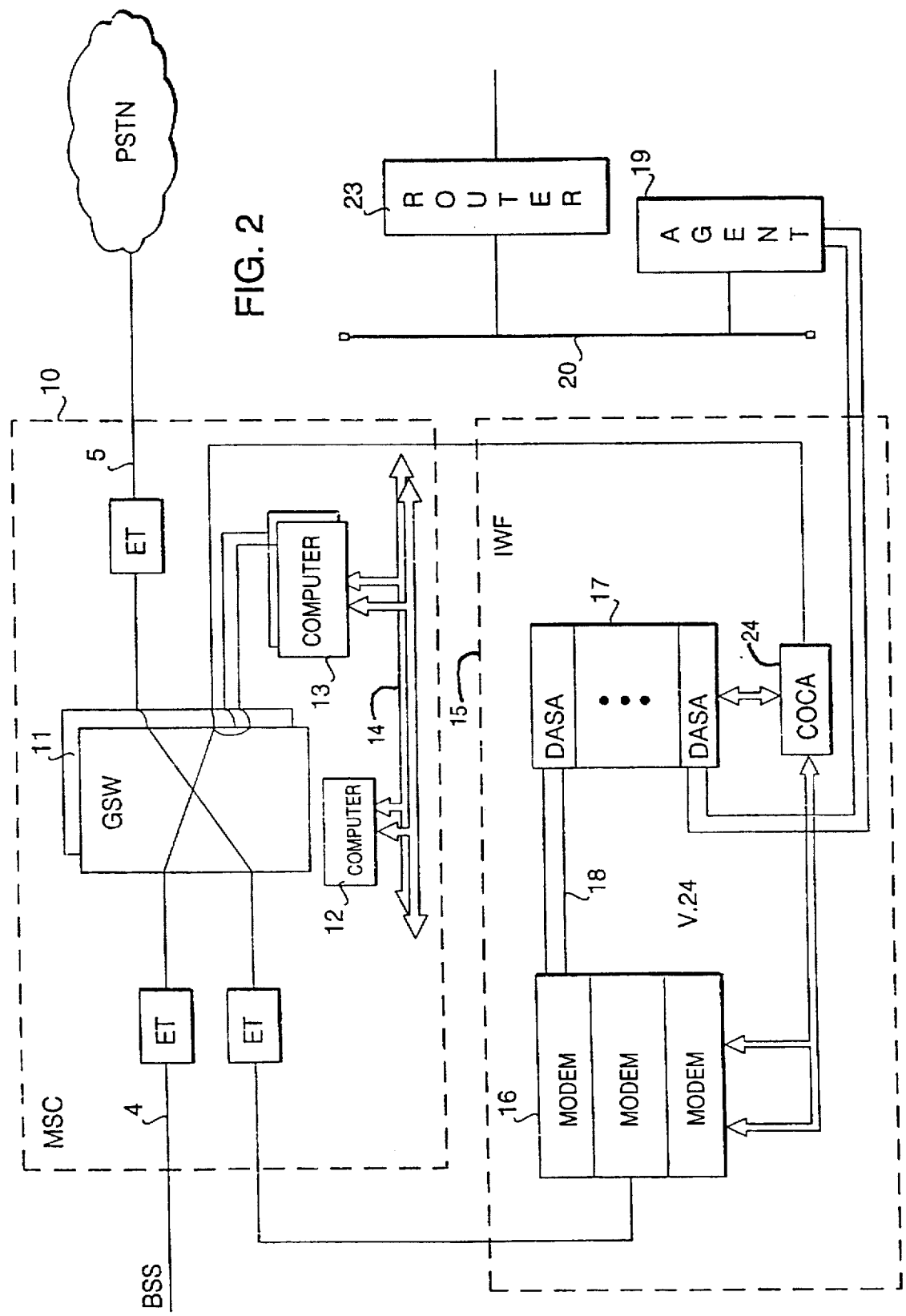

For the sake of clarity, FIG. 2 shows only a switching field 11 and call control of the mobile exchange MSC 10; in this specific case, the call control is a decentralized computer system comprising computers 12, 13 and an interconnecting message bus 14. In practice, the MSC may contain a great number of different devices. The switching field 11 may be an analog or a digital switching means, which selectively switches speech and data connections from the base station system BSS between inbound transmission lines 4 and transmission lines 5 from the mobile exchange. As an example of such digital mobile exchanges, is the DX 200 MSC of Nokia.

A network termination unit 15 (IWF) is connected in parallel with the switching field 11. One or more further network termination units may be similarly connected in parallel with the switching field 11. The network termination unit 15 comprises a transmission unit COCA 24 on the side of a port P1. The COCA takes care of functions required by the transmission connection between the exchange MSC and the base station BTS, such as multiplexing. In the specific case, the transmission connection is a 2-Mbit/s PCM connection on which 30 channels are transmitted. For each channel there is provided a data communication service adapter DASA 17, to which the COCA 24 connects the channel and which provides matching between the GSM data connection and a V.24 interface 18. For conventional modem connections to be established via a public switched telephone network PSTN, the network termination unit 15 comprises a group 16 of three data modems of different types. The control interface of each modem that is effectively in use is connected to the V.24 interface 18, and its line or modem interface is connected to the switching field 11.

In FIG. 1, the remote workstation equipment comprises a mobile radio station 3 (MS) and a remote workstation 4 (e.g. a personal computer PC) attached to it. For data communication, the above-mentioned data connection from the remote workstation 3, 4 to the exchange MSC 10 is established by means of a radio link between the mobile radio station 3 (mobile telephone) and the base station system BSS on a logical traffic channel.

Referring to FIG. 2, the switching field 11 switches a data connection to the network termination unit 15 for conventional data communication by means of modems. In the network termination unit, one of the DASAs 17 adapts the data connection to the V.24 interface 18 and through it to the data modems 16. The line interface (modem interface) of the data modems 16 is connected to a conventional wired connection, which in this specific case is connected, e.g. via the public switched telephone network PSTN, to another data modem (not shown). The modems signal in a normal way over a modem connection established between them. The remote workstation 3, 4 in turn controls the operation of the data modem 16 via the GSM data connection and transmits data to and receives data from the data modem 16, respectively.

In the preferred embodiment of the invention shown in FIG. 1, an interconnecting computer 19 is attached to the exchange MSC for connections to other data networks, such as LAN networks. This interconnecting computer, which will be called the AGENT 19 hereinbelow, establishes a bus between the remote workstation 4 and a desired LAN. The network termination unit 15 has at least one of the DASAs 17 dedicated to interfacing a 9.6-kbit/s GSM data connection to the V.24 interface, which in turn is connected to the AGENT computer 19. In other words, the AGENT computer 19 is connected to the MSC as a kind of PAD (Packet Assembly/Disassembly), for which the GSM recommendations define special interfacing. No kind of modems are needed.

The AGENT computer 19 is preferably a commercial computer typically running an OS/2 2.x, Windows NT or UNIX operating system. In the preferred embodiment of the invention shown in FIG. 1, the GSM operator has its own local LAN segment 20 dedicated to interconnecting the MSC, the AGENT computer 19 and several customer LANs. The AGENT computer 19 is connected directly to this local LAN segment 20.

In the preferred embodiment of the invention, the protocol applied towards the public data network is TCP/IP (Transmission Control Protocol/Internet Protocol). In other words, the solution according to the invention offers the IP service for the remote workstations of the mobile communication network. The protocol between the remote workstation 4 and the AGENT computer 19 is the Virtual Channel Protocol (VCP) specified and developed by Nokia Inc. The VCP is below the IP layer. The remote workstation 4 has a dedicated GSM/IP address in addition to its possible home IP address. The GSM/IP address is assigned by the GSM/data network operator, and a router 21, which connects the customer's home LAN, e.g. to a public Internet network 22, is configured to process this GSM/IP address. In addition, the mobile communication network has special GSM/ARP (GSM specific Address Resolution Protocol) and GSM/RARP (GSM specific Reverse Address Resolution Protocol) protocols. The GSM/ARP is used to determine the GSM telephone number from the IP address, and the GSM/RARP is used to determine the IP address from the GSM telephone number.

A remote workstation 4 that wishes to start a data session dials the telephone number reserved for the AGENT computer 19 and starts the establishment of a GSM data connection between the mobile unit MS 3 and the exchange MSC 10, and so the switching field 11 routes the data call to the network termination unit 15 to which the AGENT computer 19 is connected. The AGENT computer 19 comprises a database containing information about subscribers authorized to use the data services. The AGENT computer 19 checks the subscriber authorization and creates an Agent Process to serve this new connection. The AGENT computer 19 then extends the connection to a customer LAN 24 through a router 23. The AGENT computer 19 simulates the operation of the remote workstation towards the customer LAN 24 located at the other end of the extended connection.

When the user of the remote workstation 4 wishes to free/release the radio connection, he/she informs the AGENT computer 19 that MS 3 and remote workstation 4 will be in a manual release state from now on. The AGENT computer 19 maintains the extended connection and continues to act as a remote workstation towards the customer-LAN by monitoring communication addressed to the remote workstation 4. If there occurs something in the customer-LAN that concerns the remote workstation 4 (e.g. electronic mail), the AGENT computer 19 informs the remote workstation 4 via the radio path by means of non-switched message transmission, such as the GSM short message service (SMS). The user thus has the responsibility to re-establish the GSM data connection to the AGENT computer 19 for certain measures (such as reading electronic mail).

Another alternative is to use automatic release of a GSM data connection. The data communication software of the remote workstation 4 releases the connection automatically when a sufficiently long break, i.e. a predetermined period of time, has occurred in the data communication. The duration of the break may be negotiated at the outset of each connection establishment. The AGENT computer 19 maintains the extended connection and continues to operate as a remote workstation towards the customer LAN 24. If the remote workstation 4 has data to be transmitted towards the customer LAN, the telecommunication software establishes a data connection to the AGENT computer 19. If the customer LAN 24 has data to be transmitted to the remote workstation 4, the AGENT computer 19 transmits a short message to the telecommunication software of the remote workstation 4, and the software then re-establishes the data connection. As the AGENT computer 19 is already operating, and the extended connection to the LAN 24 has already been set up, the establishment of the data connection to the AGENT computer 19 is all that is needed, and so the time required for re-establishing the connection is considerably shorter.

It is possible to omit the local LAN segment 20 of the GSM operator shown in the figure, integrate the AGENT computer 19 and the router 23, and connect this integrated unit directly to a telecommunication network 22.

Also in other respects, the figures and the description related to them are only intended to illustrate the present invention. In its details the invention may vary within the spirit and scope of the attached claims.

We claim:

1. A mobile communication system, comprising:

a mobile data unit acting via a digital mobile communication network as a remote workstation in a data network;

a mobile exchange;

means for establishing a digital data connection between said mobile data unit and said mobile exchange; and an interconnecting computer attached to said mobile exchange, the interconnecting computer being connected to said data network by a digital interface and arranged for extending said digital data connection and simulating said remote workstation towards said data network in order to establish a digital end-to-end connection between said mobile data unit and any other party in said data network.

2. The mobile communication system according to claim 1, wherein:

said mobile exchange is arranged to establish said digital data connection to said interconnecting computer in response to dialing of a predetermined number of said interconnecting computer by said mobile data unit.

3. The mobile communication system according to claim 1 or 2, wherein:

said interconnecting computer is arranged to maintain said data connection extended towards said data network when said data connection between said mobile data unit and said mobile exchange is released temporarily during a session.

4. The mobile communication system according to claim 1, wherein:

said data network is a local area network.

5. The mobile communication system according to claim 1, further comprising:

a local area network, to which said interconnecting computer is connected.

6. The mobile communication system according to claim 1, wherein said interconnecting computer comprises a database including subscriber authorization information.

7. The mobile communication system according to claim 1, wherein said digital mobile communication network is a GSM communication network.

8. A method for connecting a remote workstation to a data network via a digital mobile communication network, comprising the steps of:

starting a data session from said remote workstation;

establishing a digital data connection over a radio path between said remote workstation and an interconnecting computer connected to said data network by a digital interface in said mobile communication network for said data session;

extending said digital data connection between said mobile communication network and said data network by said interconnecting computer in order to establish a digital end-to-end connection between said mobile data unit and any other party in said data network; and temporarily releasing said digital data connection in said mobile communication network during said data session, and, when said digital data connection has been temporarily released:

a) maintaining said digital data connection extended towards said data network by said interconnected computer;

b) simulating operation of said remote workstation towards said data network at said interconnected computer; and c) monitoring communication addressed from said data network to said remote workstation at said interconnected computer, and upon sensing existence of a communication addressed from said data network to said remote workstation transmitting a notification to said remote workstation over said radio path by sending a connectionless message transmission.

9. The method according to claims 8, further including:

reestablishing said data connection in said mobile communication network during said data session on an initiative of said remote workstation.

10. The method according to claim 8 or 9, further comprising:

starting said temporarily releasing of said data connection manually by a user of said remote workstation.

11. The method according to claims 8 or 9, further comprising:

starting said temporarily releasing of said data connection automatically after a predetermined period of time has elapsed from a respectively most recent communication event on said data connection.

12. The method according to claim 11, further including:

negotiating said predetermined period of time at an outset of said data session.

13. The method according to claim 8, further comprising:

carrying out said non-switched message transmission as a short-message transmission.

14. A mobile communication system, comprising:

a mobile data unit acting via a digital mobile communication network as a remote workstation in a data network;

a mobile exchange; and an interconnecting computer attached to said mobile exchange, the interconnecting computer being connected to said data network by a digital interface and arranged for extending said digital data connection and simulating said remote workstation towards said data network in order to establish a digital end-to-end connection between said mobile data unit and any other party in said data network, wherein said mobile data unit and said mobile exchange are connected via a radio communication path.

15. The mobile communication system according to claim 14, wherein said interconnecting computer comprises a database including subscriber authorization information.

16. The mobile communication system according to claim 14, wherein said digital mobile communication network is a GSM communication network.

* * * * *